(12) United States Patent
Durand (10) Patent No.: US 11,209,066 B2
(45) Date of Patent: Dec. 28, 2021

(54) DAMPING BEARING WITH AXIAL PRELOAD

(71) Applicant: JTEKT EUROPE, Irigny (FR)

(72) Inventor: Philippe Durand, Villeurbanne (FR)

(73) Assignee: JTEKT EUROPE, Irigny (FR)

( * ) Notice: Subject to any disclaimer, the term of this patent is extended or adjusted under 35 U.S.C. 154(b) by 224 days.

(21) Appl. No.: 16/335,465

(22) PCT Filed: Oct. 9, 2017

(86) PCT No.: PCT/FR2017/052761
§ 371 (c)(1),
(2) Date: Mar. 21, 2019

(87) PCT Pub. No.: WO2018/069617
PCT Pub. Date: Apr. 19, 2018

(65) Prior Publication Data
US 2020/0018371 A1    Jan. 16, 2020

(30) Foreign Application Priority Data
Oct. 11, 2016   (FR) ...................................... 16/59802

(51) Int. Cl.
*F16F 1/38* (2006.01)
*B29C 45/14* (2006.01)
(Continued)

(52) U.S. Cl.
CPC ...... *F16F 1/3842* (2013.01); *B29C 45/14491* (2013.01); *B62D 7/228* (2013.01);
(Continued)

(58) Field of Classification Search
CPC ............... F16F 1/3842; F16F 2224/025; F16F 2226/04; F16F 2228/08; F16F 1/3814;
(Continued)

(56) References Cited

U.S. PATENT DOCUMENTS 2,004,712 A * 6/1935 Thiry ...................... F16D 3/76
403/226
2,126,707 A * 8/1938 Schmidt ............... F16F 1/3814
267/140.5
(Continued)

FOREIGN PATENT DOCUMENTS

DE         861624 C    1/1953
JP     H11-270606 A   10/1999

OTHER PUBLICATIONS

Aug. 2, 2018 International Search Report issued in International Patent Application No. PCT/FR2017/052761.
(Continued)

*Primary Examiner* — Paul N Dickson
*Assistant Examiner* — Timothy Wilhelm
(74) *Attorney, Agent, or Firm* — Oliff PLC (57) ABSTRACT

A method of manufacturing a damping device, notably for a steering tie rod, the said device comprising a rod which extends along a main axis and which is intended to be connected to a first mechanical component, a securing portion which surrounds the said rod and which is intended to be connected to a second mechanical component, and a sleeve made of elastomeric material which is arranged between the rod and the fixing bushing so as, through elastic deformation thereof, to allow at least axial movement of the fixing bushing with respect to the rod, in which method the fixing bushing is offset axially with respect to the rod to force the elastic deformation of the sleeve and the introduction of a corresponding preload, then the sleeve is locked so as to keep it, when the device is at rest, in a state of permanent axial elastic deformation and preload.

10 Claims, 2 Drawing Sheets

(51) Int. Cl.
  *B62D 7/22* (2006.01)
  *B29L 31/30* (2006.01)
  *B62D 5/04* (2006.01)

(52) U.S. Cl.
  CPC .. *B29K 2905/00* (2013.01); *B29K 2995/0046* (2013.01); *B29L 2031/3002* (2013.01); *B62D 5/04* (2013.01); *F16F 2224/025* (2013.01); *F16F 2226/04* (2013.01); *F16F 2228/08* (2013.01)

(58) Field of Classification Search
  CPC .... B29C 45/14491; B62D 7/228; B62D 5/04; B29K 2905/00; B29K 2995/0046; B29L 2031/3002
  See application file for complete search history.

(56) References Cited

U.S. PATENT DOCUMENTS

| | | | | | |
|---|---|---|---|---|---|
| 2,414,743 | A | * | 1/1947 | Kaemmerling | F16F 1/3935 403/203 |
| 2,716,566 | A | * | 8/1955 | Thiry | F16F 1/3814 403/228 |
| 2,941,766 | A | * | 6/1960 | Van Ranst | F16F 1/3814 267/141.7 |
| 2,980,439 | A | * | 4/1961 | Earl | F16F 1/3814 280/681 |
| 3,121,560 | A | * | 2/1964 | Reed | B60G 11/22 267/258 |
| 3,135,540 | A | * | 6/1964 | Herbenar | F16C 11/0604 403/124 |
| 3,304,136 | A | * | 2/1967 | Alf | F16F 1/38 384/153 |
| 3,781,073 | A | * | 12/1973 | Jorn | F16F 1/3863 384/291 |
| 3,948,497 | A | * | 4/1976 | Lovitt | B60R 19/30 267/201 |
| 3,975,007 | A | * | 8/1976 | Chorkey | B60G 15/08 267/152 |
| 4,187,033 | A | * | 2/1980 | Zukowski | B62D 7/18 403/137 |
| 4,630,809 | A | * | 12/1986 | Duckworth | E21B 47/18 267/141.1 |
| 4,809,960 | A | * | 3/1989 | Kakimoto | B60G 7/00 248/634 |
| 5,069,431 | A | * | 12/1991 | Kakimoto | B60G 7/02 267/141 |
| 5,074,535 | A | * | 12/1991 | Colford | F16F 1/424 267/293 |
| 5,544,715 | A | * | 8/1996 | Phillips | B62D 5/06 180/417 |
| 5,593,233 | A | * | 1/1997 | Kammel | B60G 7/02 384/222 |
| 6,082,721 | A | * | 7/2000 | Kingsley | F16B 11/008 267/276 |
| 6,224,047 | B1 | * | 5/2001 | Gwinn | B61F 5/142 267/141 |
| 6,257,563 | B1 | * | 7/2001 | Oellers | B62D 7/22 267/141.1 |
| 6,430,774 | B1 | * | 8/2002 | McLaughlin | B60G 11/12 16/2.1 |
| 6,666,438 | B2 | * | 12/2003 | Nakagawa | F16F 1/3814 267/140.12 |
| 7,234,693 | B2 | * | 6/2007 | Schnaars | F16F 1/3863 267/140.11 |
| 7,441,759 | B2 | * | 10/2008 | Franke | F16F 1/3842 267/279 |
| 7,540,478 | B2 | * | 6/2009 | de Fontenay | B60G 7/006 267/140.12 |
| 7,644,911 | B2 | * | 1/2010 | Rodecker | F16F 1/373 267/293 |
| 8,070,143 | B2 | * | 12/2011 | Wietharn | F16F 1/403 267/141.4 |
| 8,071,003 | B2 | * | 12/2011 | Imaeda | F16F 1/3842 264/262 |
| 8,376,332 | B2 | * | 2/2013 | Scharf | F16F 1/3828 267/281 |
| 8,939,440 | B2 | * | 1/2015 | Namito | F16F 1/3842 267/293 |
| 9,194,423 | B2 | * | 11/2015 | Bussit | F16C 19/06 |
| 9,512,893 | B2 | * | 12/2016 | Yahata | F16F 1/3863 |
| 9,518,628 | B2 | * | 12/2016 | Yahata | F16F 1/3842 |
| 10,137,926 | B2 | * | 11/2018 | Strobel | B62D 5/0409 |
| 10,508,701 | B2 | * | 12/2019 | Cerri, III | F16F 1/3842 |
| 10,655,697 | B2 | * | 5/2020 | Senneff | F16F 1/3842 |
| 10,704,637 | B2 | * | 7/2020 | Zimmerman | F16F 1/3863 |
| 2003/0068104 | A1 | | 4/2003 | Loftus | |
| 2004/0011103 | A1 | * | 1/2004 | Takahashi | B21K 21/14 72/84 |
| 2005/0191120 | A1 | * | 9/2005 | Oellers | F16C 11/0652 403/133 |
| 2006/0012092 | A1 | * | 1/2006 | Siemer | B60G 7/02 267/141.2 |
| 2006/0131800 | A1 | * | 6/2006 | Hori | B60G 7/02 267/293 |
| 2013/0049272 | A1 | * | 2/2013 | Marx | F16F 1/3842 267/141.2 |
| 2013/0084740 | A1 | * | 4/2013 | Paynter | H01R 13/5845 439/604 |
| 2015/0323031 | A1 | * | 11/2015 | Yahata | F16F 1/3863 267/141.2 |
| 2016/0341271 | A1 | * | 11/2016 | Yahata | F16F 1/38 |
| 2016/0363242 | A1 | * | 12/2016 | De Nora | B29C 48/09 |
| 2017/0276204 | A1 | * | 9/2017 | Uno | F16F 1/40 |
| 2017/0291268 | A1 | * | 10/2017 | McArthy | F16J 15/3276 |
| 2019/0170210 | A1 | * | 6/2019 | Ohji | F16F 1/3814 |
| 2019/0256137 | A1 | * | 8/2019 | Durand | F16F 1/38 |
| 2020/0393017 | A1 | * | 12/2020 | Axman | F16F 15/08 |

OTHER PUBLICATIONS

Jun. 8, 2021 Office Action issued in Japanese Patent Application No. 2019-519699.

* cited by examiner

DAMPING BEARING WITH AXIAL PRELOAD

The present invention concerns the field of tie rods used to transmit a mechanical movement between a first movable part and a second movable part.

The present invention concerns more particularly the tie rods used in the steering mechanisms of motor vehicles.

It is known to provide, within the steering mechanisms, and more particularly within the tie rods, bearings provided with a damping device formed by an elastomeric pad intended to damp shocks and vibrations produced by the roughness of the road.

Moreover, the inventors have discovered that the presence of a suitably sized damping member could advantageously allow creating, when the driver maneuvers the steering wheel, a phase shift (a delay) between the orientation angle of the steered wheels and the angle of the steering wheel, a phase shift which has the consequence of increasing the steering radius of the vehicle, relative to what would be said steering radius if the wheels exactly and instantly followed the steering wheel angle, and thus decreasing the yaw rate of the vehicle, so that the vehicle is less likely to oversteer.

However, the known damping devices have a behavior that is sometimes poorly controlled, and in particular an asymmetrical behavior depending on whether they are biased in compression or in tension, so that the damping provided can be imperfect, and disturb the driving sensations perceived by the driver through the steering wheel, or even affect the dynamic behavior and the stability of the vehicle.

The objects assigned to the invention consequently aim at overcoming the aforementioned drawbacks, and at proposing a new method for manufacturing a damping device, and more generally a tie rod equipped with such a damping device, which allow obtaining a balanced damping effect in both tension and compression, and in particular which allow improving the dynamic behavior of a vehicle, by making it safer.

The objects assigned to the invention are achieved by means of a method for manufacturing a damping device comprising a shaft, which extends along a main axis (XX') and which is intended to be connected to a first mechanical part, a fixing bushing which surrounds said shaft and which is intended to be connected to a second mechanical part, as well as a sleeve made of elastomeric material which is arranged between the shaft and the fixing bushing so as to allow, by its elastic deformation, at least one axial displacement of the fixing bushing relative to the shaft, said method being characterized in that it includes:

a preparation step (a), during which the shaft is inserted into the fixing bushing so that the fixing bushing at least partially surrounds the shaft and axially occupies a first position relative to said shaft, and a filling space is provided radially between the shaft and the fixing bushing, an over-molding step (b), during which the filling space is at least partially filled so as to create the elastomeric sleeve which links the shaft to the fixing bushing, a step (c) of creating a preload, during which the axial displacement of the fixing bushing relative to the shaft (or vice versa) is forced in a direction called «load direction», so as to axially offset the fixing bushing from its first position to a second position axially distinct from the first position, against an elastic deformation of the sleeve, in order to create an axial preload of said sleeve, and therefore an axial preload of the shaft relative to the bushing (that is to say more generally an axial preload of the device), a locking step (d), during which the elastomeric sleeve is locked against the shaft, or against the fixing bushing, so as to maintain on the one hand a relative mobility of the shaft relative to the fixing bushing, via the sleeve, and on the other hand at least partly maintain the axial preload of the sleeve, and therefore at least partly maintain the axial preload of the shaft relative to the fixing bushing.

The objects assigned to the invention are also achieved by means of a damping device comprising a shaft, which extends along a main axis (XX') and which is intended to be connected to a first mechanical part, a fixing bushing which surrounds said shaft and which is intended to be connected to a second mechanical part, as well as a sleeve made of elastomeric material which is arranged between the shaft and the fixing bushing so as to allow, by its elastic deformation, at least one axial displacement of the fixing bushing relative to the shaft, said device being characterized in that the sleeve is maintained by the shaft, when the device is at rest, in a state of permanent axial elastic deformation which creates and maintains an axial preload of said sleeve, and therefore an axial preload of the shaft relative to the bushing (that is to say more generally an axial preload of the device).

Advantageously, the introduction of a residual axial preload within the elastomeric sleeve allows, in practice, offsetting the stiffness curve of said sleeve, and therefore to «polarize» the damping device so that it adopts a different elastic mechanical behavior (stiffer or, on the contrary, more flexible), depending on whether it is biased in tension or on the contrary in compression along the main axis (XX').

Advantageously, the preload of the sleeve may in particular be calculated in order to compensate for the permanent effects of tensile stresses, or compression stresses, which are induced, in the absence of shocks or vibrations, by the geometric arrangement of the running gear.

Indeed, the inventors have found that the geometry of the front axle, which carries the steered wheels, generally induces a permanent axial force in the tie rod, due to the parallelism setting. This permanent axial force may be, depending on the case, in tension or in compression, and may disturb the driving experience, which differs according to whether the driver maneuvers the steering wheel to the left or to the right.

Advantageously, thanks to the invention, the elastic preload specific to the sleeve (and more generally the preload specific to the damping device) allows compensating for these permanent axial forces induced by the running gear, and thus recreating in fine a symmetrical damping behavior, in order to absorb the forces, the shocks and vibrations in a substantially equal manner both in tension and in compression.

Hence, the presence of a damping device which is prestressed so as to compensate for the permanent axial forces allows restoring the symmetry of the steering mechanism behavior, and more generally the symmetry of the dynamic behavior of the vehicle.

Indeed, the invention guarantees, on the one hand, a driving experience that will be symmetrical, since the damping device allows the steering mechanism to provide symmetrical sensations when the steering wheel is steered to the left and when the steering wheel is steered to the right, and on the other hand a yaw behavior of the vehicle which will also be symmetrical, since the phase shift between the steering wheel angle and the yaw angle of the steered wheels is symmetrically generated by the damping device, both in left turn and in right turn.

Other objects, characteristics and advantages of the invention will appear in further detail upon reading the following description, as well as by using the appended drawings, provided for purely illustrative and non-limiting purposes, among which.

The present invention concerns a method for manufacturing a damping device 1.

Said damping device 1 is more particularly intended to be implanted within a tie rod 2, which preferably equips a steering system 3.

Figure 1:
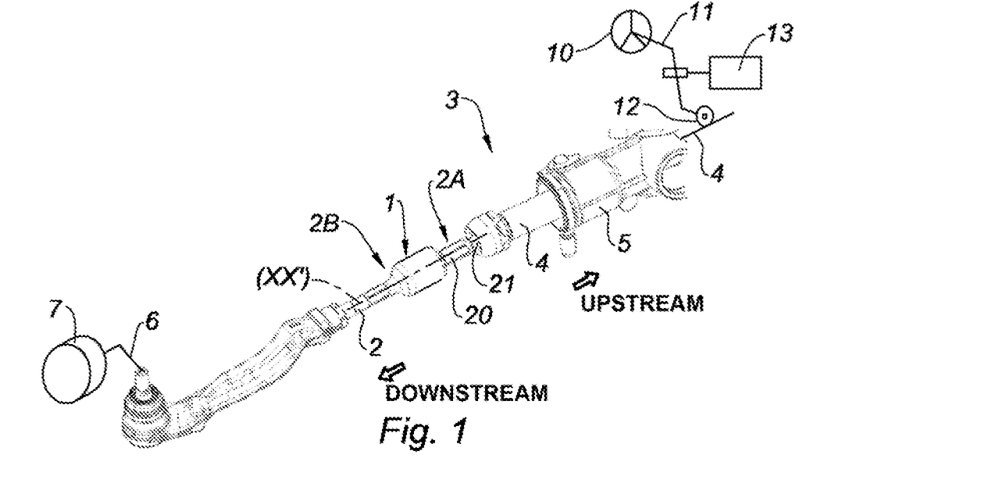
FIG. 1 illustrates, in an overall perspective view, a steering mechanism comprising a tie rod whose shaft is provided with a damping device according to the invention.

In a manner known per se, and as illustrated in FIG. 1, the steering system 3 may comprise a rack 4 which is movable and guided in translation in a steering casing 5, and which is connected to the tie rod 2 so that when the rack 5 is displaced, it drives said tie rod 2 which in turn acts on a stub axle 6 in order to modify the yaw orientation (the steering angle) of a steered wheel 7.

The steering system 3 may also comprise a steering wheel 10 allowing the driver to actuate the steering system 3, for example via a steering column 11 carrying a pinion 12 which meshes with the rack 4.

Preferably, the steering system 3 forms a power steering system, equipped with an assist motor 13, preferably an electrical assist motor, for example of the brushless type, said assist motor 13 being intended to produce an assist force which assists the driver to maneuver the steering system 3, according to predetermined assist laws which are stored in a calculator.

According to the invention, the damping device 1 comprises a shaft 20, which extends along a main axis (XX') and which is intended to be connected to a first mechanical part, such as, for example, the above-mentioned rack 4 (in what follows, for convenience, the rack 4 can therefore be assimilated to the first mechanical part 4).

In a particularly preferred manner, said main axis corresponds to the longitudinal axis of said shaft 20.

The shaft 20 preferably has a cylindrical shape whose main axis (XX') forms the central axis, and more preferentially a shape of revolution about said main axis (XX').

For convenience of description, it will be referred by «axial» to a direction or a dimension considered coaxial or parallel to said main axis (XX'), and by «radial» to a direction or a dimension considered perpendicular to said main axis (XX').

Preferably, the shaft 20 belongs to a tie rod 2.

The shaft 20 thus forms at least one portion, here for example an upstream portion 2A, of a tie rod pivot-shaft.

Said upstream portion of the tie rod shaft 2A carries at its end a hinge member 21, of the ball-joint sphere type, which allows the tie rod 2 to be hinged at an end of the rack 4.

The main axis (XX') preferably substantially coincides with the longitudinal axis of the tie rod 2.

Figure 5:
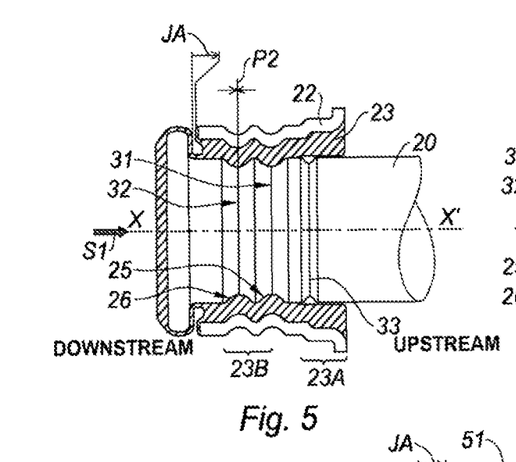
FIG. 5 illustrates, according to a longitudinal sectional view, a step (c) of creating a preload in the sleeve of FIG. 4, according to which the shaft is offset (here in tension in the upstream direction) relative to the fixing bushing for placing said bushing in its second position relative to the shaft.
Figure 6:
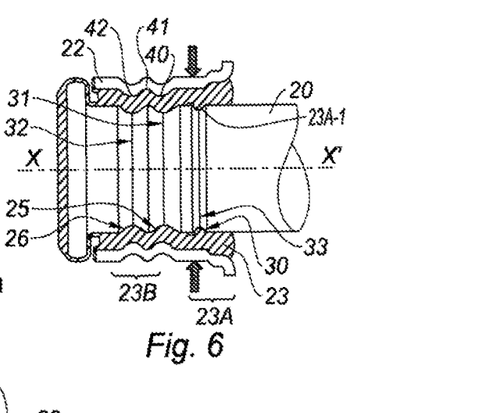
FIG. 6 illustrates, in a longitudinal sectional view, a locking step (d), during which a segment of the sleeve is tightened into a locking groove of the shaft, under the effect of a plastic constriction of the fixing bushing.
Figure 7:
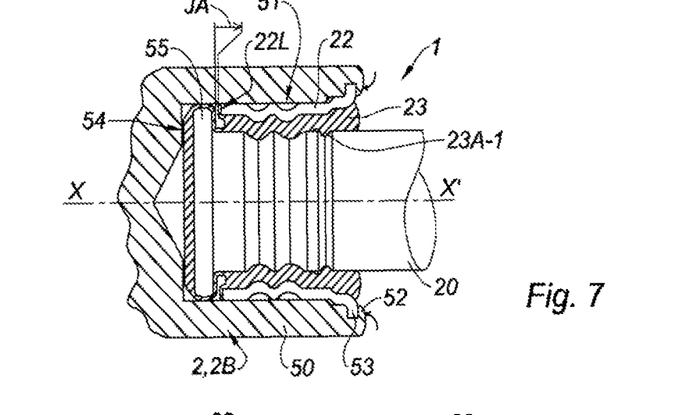
FIG. 7 illustrates, in a longitudinal sectional view, an assembly step (e) during which the fixing bushing is fixed to a case belonging to the second mechanical part, here a downstream segment of a tie rod shaft.

As illustrated in FIGS. 2 to 8, the damping device 1 also comprises a fixing bushing 22 which surrounds the shaft 20 and which is intended to be connected to a second mechanical part 2B, distinct from the first mechanical part 4, such as for example, as illustrated in FIGS. 1 and 7, a downstream portion 2B of the tie rod 2 shaft, which in turn is connected to the stub axle 6.

Preferably, said fixing bushing 22 is made of a metal material, adapted to be plastically deformed for performing a crimping.

By simple convention, and as indicated in particular in FIG. 1, it will be considered as an «upstream-downstream» direction the direction from the first mechanical part 4 (and more generally from the steering casing 5 and the rack 4) to the second mechanical part 2B (and more generally the stub axle 6 and the wheel 7).

The damping device 1 is advantageously designed to enable a damped relative movement, and in particular at least a damped axial relative movement, within a predetermined limited displacement range, of the shaft 20 relative to the fixing bushing 22, and therefore more generally of the first mechanical part 4 (upstream) relative to the second mechanical part 2B (downstream).

In a particularly preferred manner, the damping device 1 is designed to enable at least one axial relative displacement of the shaft 20, and therefore of the first mechanical part 4, relative to the fixing bushing 22 and therefore relative to the second mechanical part 2B, in response to axial tension and compression force components, which substantially act in the direction of the main axis (XX') of the shaft 20.

Thus, as indicated above, the damping device 1 will allow damping forces, shocks and/or vibrations at least in the direction of the main axis (XX'), and, in the particular case of a use within a steering system 3, creating a phase shift (delay) between the maneuvers of the steering wheel 10 made by the driver and the corresponding reactions in yaw of the steered wheels 7, in order to improve the dynamic behavior of the turning vehicle.

To this end, the damping device 1 further includes a sleeve 23 made of elastomeric material which is arranged between the shaft 20 and the fixing bushing 22 so as to allow, by its elastic deformation, at least one axial displacement of the fixing bushing 22 relative to the shaft 20.

The sleeve 23, thanks to its intrinsic elasticity, advantageously acts as a damping pad capable of absorbing, at least axially, the vibratory movements or small amplitude bursts of the fixing bushing 22 relative to the shaft 20 (and vice versa), and consequently the vibratory movements or small amplitude bursts of the second mechanical part (downstream portion 2B of the tie rod shaft linked to the stub axle 6) relative to the first mechanical part (rack 4), and vice versa.

The sleeve 23, and more generally the damping device 1, thus forms a deformable interface which axially separates the first mechanical part 4 and the second mechanical part 2B, 6 from each other, which are located respectively upstream of said interface and downstream of said interface, and which are linked to each other via the tie rod 2, and more particularly via said damping device 1.

An effective damping can thus be obtained by means of a device 1 which is particularly compact, reliable, and moreover easy and inexpensive to manufacture.

Figure 3:
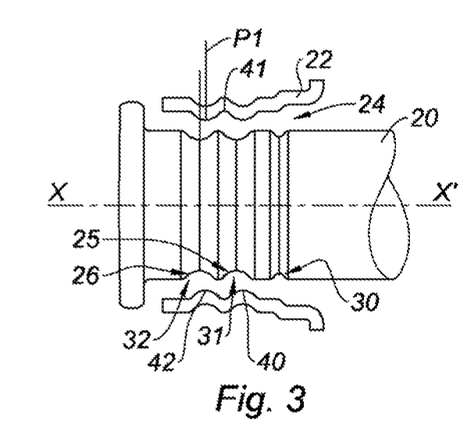
FIG. 3 illustrates, in a longitudinal sectional view along the main axis (XX'), a step (a) of placing the fixing bushing in its first position around the shaft.

According to the invention, the manufacturing method includes a preparation step (a), during which the shaft 20 is inserted into the fixing bushing 22 (or conversely the fixing bushing 22 is threaded onto the shaft 20) so that the fixing bushing 22 at least partially surrounds the shaft 20 and axially occupies a first position P1 relative to said shaft 20, and a filling space 24 is provided radially between the shaft 20 and the fixing bushing 22, as illustrated in FIG. 3.

Figure 4:
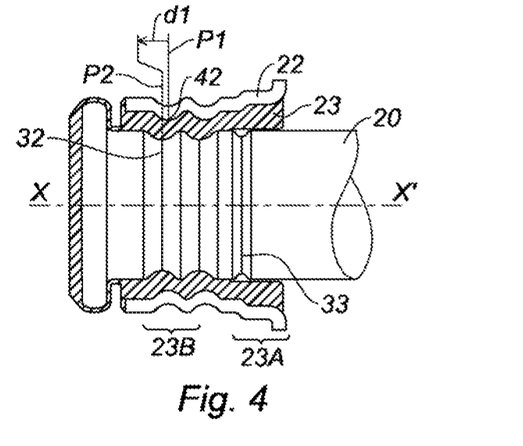
FIG. 4 illustrates, in a longitudinal sectional view, a step (b) of over-molding the sleeve between the shaft and the fixing bushing of FIG. 4.

The method then includes an over-molding step (b), during which the filling space 24 is at least partially filled with an elastomeric material or an elastomeric material precursor, so as to create the elastomeric sleeve 23 which links the shaft 20 to the fixing bushing 22, as illustrated in FIG. 4.

The sleeve 23 thus forms a bridge which radially extends from a portion of the radially outer wall of the shaft 20 to a corresponding portion of the radially inner wall of the fixing bushing 22 (whose diameter is greater than the diameter of the radially outer wall of the shaft 20 at least over the area axially covered by the bushing 22), and which adheres to said respective walls of the shaft 20 and the fixing bushing 22.

The over-molding advantageously constitutes a rapid and inexpensive production method, and which further allows manufacturing a sleeve which, when filling the filling space 24 by the liquid elastomer, automatically mates the respective shapes of the shaft 20 and the fixing bushing 22, regardless of the complexity of said shapes.

The method then includes a step (c) of creating a preload, during which the axial displacement of the fixing bushing 22 relative to the shaft 20 (or vice versa) is forced in a direction called «load direction» S1, so as to axially offset the fixing bushing 22 from its first position P1 to a second position P2 axially distinct from the first position P1, against an elastic deformation of the sleeve 23, in order to create an axial preload of said sleeve 23, and therefore an axial preload of the shaft 20 relative to the fixing bushing 22, that is to say more generally an axial preload of the device 1, as illustrated in FIG. 5.

The load direction S1 will be selected depending on the desired nature of the preload, according to whether a preload in compression or a preload in tension of the damping device 1 is desired.

Conventionally, it will be considered that a «preload in tension» means that an axial tension is exerted on the shaft 20 in the upstream direction, while the bushing 22 is retained in tension in the downstream direction, that is to say that a tension is exerted on the upstream segment of the device 1 against the downstream segment of the device 1 (and vice versa), while thus pulling on the device 1 on either side of the deformable interface that forms the sleeve 23, in a direction that moves the upstream portion 2A of said shaft 20 away from the bushing 22, that is to say in a direction that is equivalent to axially moving the upstream first mechanical part 4 away from the downstream second mechanical part 2B, as illustrated by the «load direction S1» in FIG. 5.

Conventionally, it will therefore be considered that such a preload in tension, which tends to increase the overall axial length of the device 1, corresponds to a «stretched» configuration of the device 1.

In fact, considering the particular arrangement illustrated in FIGS. 3 to 7, this preload in tension of the device 1 has here the effect of locally stressing in compression (and in axial shearing) the sleeve 23 which is located at the interface between the shaft 20 and the downstream part 2B, and whose elastic deformation accommodates the displacement (here in remoteness) of the upstream segment of the device 1, located upstream the interface, relative to the downstream segment of this same device 1, located downstream the interface.

Conversely, performing a preload in compression corresponds to forcing the axial approximation of the upstream of the shaft 20 to the fixing bushing 22 (that is to say in the downstream direction), which is equivalent to moving the upstream mechanical part 4 towards the downstream mechanical part 2B, against the elastic deformation of the sleeve 23, in a direction opposite to the load direction S1 illustrated in FIG. 5.

Conventionally, it will be considered that such a preload in compression, which tends to reduce the overall axial length of the device 1, corresponds to a «compressed» configuration of the device 1.

In any case, regardless of the selected direction (tension or compression) to preload the device 1, the elastic sleeve 23, under the effect of the preload, naturally tends to (elastically) return the fixing bushing 22 to its first position P1.

As an indication, the axial offset d1, that is to say the axial distance between the first position P1 and the second position P2, may be comprised between 0.2 mm and 5 mm.

The method finally includes a locking step (d), during which the elastomeric sleeve 23 is locked against the shaft 20, or where appropriate, against the fixing bushing 22, so as to at least partly maintain the axial preload of said sleeve 23, and more generally so as to at least partly maintain the axial preload of the device 1, as illustrated in FIG. 6.

In other words, the method therefore includes a locking step (d), during which the elastomeric sleeve 23 is locked against the shaft 20, or, alternatively, against the fixing bushing 22, so as to maintain on the one hand a relative mobility of the shaft 20 relative to the fixing bushing 22, via the sleeve 23, and on the other hand at least partly maintain the axial preload of the sleeve (23) and therefore at least partly maintain the axial preload of the shaft 20 relative to the fixing bushing 22.

The locking allows blocking the sleeve 23 in the deformed configuration (stretched, or on the contrary compressed) which corresponds to the desired (residual) preload.

This locking also has the consequence of preventing the sleeve from spontaneously returning the fixing bushing 22 in its first position P1, said fixing bushing 22 being thus maintained in its second position P2, after locking, and at rest, that is to say when the damping device 1 is not biased in axial tension or compression by the first and second mechanical parts 4, 2B.

However, the locking does not have the effect of blocking the fixing bushing 22 relative to the shaft 20, since said bushing 22 remains, and must remain, elastically movable relative to the shaft 20, and can in particular be displaced by axial sliding, via the sleeve 23 which is elastically deformed to accompany said sliding.

Thus, ultimately, after locking, and at rest, the fixing bushing is in its second position P2, and can be elastically displaced relative to the shaft 20 (or conversely, the shaft 20 can be elastically displaced relative to the bushing 22), in particular in axial translation, on either side of said second position P2, in the vicinity of said second position P2, against the elastic return exerted by the preloaded sleeve 23 which can be deformed in order to accommodate such displacements.

It will be noted that the shaft 20 advantageously serves as a rigid carrier capable of axially maintaining the sleeve 23 in said deformed configuration and therefore preloaded configuration.

Alternatively, it could however be considered that it is the fixing bushing 22, and not the shaft 20, which acts as a rigid carrier against the sleeve 23, so that said sleeve 23, once deformed by the step (c) of creating the preload, would be maintained in preload, in the deformed configuration, exclusively by the fixing bushing 22, rather than exclusively by the shaft 20.

Figure 2:
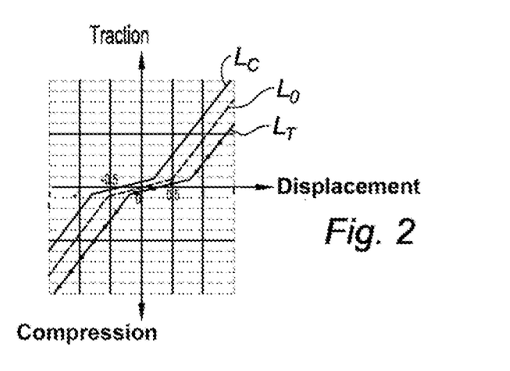
FIG. 2 illustrates, in the form of stiffness curves, the effects of a preload in tension, respectively of a preload in compression, on the behavior of the sleeve, and more generally on the behavior of the damping device according to the invention.

Of course, as visible in FIG. 2, the preload will have the effect of offsetting the stiffness curve of the damping device 1 relative to its unloaded stiffness curve L0.

Thus, when the device 1 is preloaded in tension (stiffness curve with a preload in tension $L_T$), said device 1 will oppose more tension strength, that is to say, enable, for a same given tension force, an axial displacement of the bushing 22 lower than in the absence of a preload (curve L0).

Conversely, when the device 1 is preloaded in compression (stiffness curve with a preload in compression $L_C$), said device 1 will oppose more compression strength, that is to say, enable, for a same given compression force, an axial displacement of the bushing 22 lower than in the absence of a preload (curve L0).

Preferably, the sleeve 23 has, along the main axis (XX') on the one hand a downstream segment 23B, which axially abuts, in the load direction S1, against a stop shoulder 25, 26 arranged on the shaft 20, and on the other hand an upstream segment 23A, which is forcibly displaced relative to the downstream segment 23B, and preferably here which is forcibly moved towards the downstream segment (by compression), in the load direction S1, when offsetting the fixing bushing 22 from its first position P1 to its second position P2 during step (c) of creating the preload, then which is placed, during the locking step (d), against a locking flange 30 provided on the shaft 20, as illustrated in FIG. 6, so that said upstream segment 23A cannot be displaced (by elastic return) in a direction opposite to the load direction S1, and more particularly here so that said upstream segment 23A cannot be redeployed in the upstream direction.

In other words, the sleeve 23 is thus, after locking, hooked to the shaft 20 on the one hand by its downstream segment 23, which is hooked to, and more particularly which is axially supported on (when displacing the bushing 22 relative to the shaft 20 in the selected load direction S1), the radial asperities formed by the stop shoulder(s) 25, 26 of said shaft 20, and on the other hand by its upstream segment 23A, which is hooked to, and more particularly which is axially supported on, the radial asperity that forms, at an axial distance from the stop shoulders 25, 26, the locking flange 30 of this same shaft 20.

The sleeve 23, and more particularly the intermediate segment of said sleeve which is axially comprised between the upstream segment 23A and the downstream segment 23B is therefore maintained in forced axial deformation (here in forced compression in FIGS. 5 and 6).

Advantageously, the ratio of the distance separating the locking flange 30 from the stop shoulders 25, 26 to the distance separating, at rest (before deformation), the corresponding segments 23A, 23B of the sleeve 23 thus defines the deformation degree of the sleeve 23 and therefore the preload intensity.

Preferably, the shaft 20 has a plurality of stop grooves 31, 32 (here two stop grooves 31, 32 in FIGS. 3 to 8) which are axially staggered in order to provide several annular stop shoulders 25, 26, which axially succeed one another, and which cooperate with the downstream segment 23B of the sleeve 23.

The multiplication, here the doubling, of the stop shoulders 25, 26 provides a better engagement of the sleeve 23, and more particularly of the downstream segment 23B of said sleeve 23, on the shaft 20, an engagement which allows axially stopping and even immobilizing the downstream segment 23B of the sleeve on the shaft 20 while offsetting the bushing 22, and the upstream segment 23A of the sleeve, in order to create the preload.

The annular geometry of the stop grooves 31, 32 allows reinforcing this engagement and well distributing the retaining stresses of the sleeve 23 all around the main axis (XX').

The assembly is therefore particularly robust.

Preferably, the stop grooves 31, 32 of the shaft have (in longitudinal section) rounded shapes so as to axially define, at the surface of the shaft, a corrugated hooking profile, as appears in FIGS. 3 to 8.

Advantageously, such a hooking profile with rounded shapes limits the stress concentrations, particularly in the sleeve 23, during the preload.

Furthermore, in a similar way, the fixing bushing 22 will preferably have radial asperities, and in particular a hooking profile comprising at least one convex male alternation 40, 42 forming a radial projection (of the boss type) towards the main axis (XX') and a concave female alternation 41 forming a centrifugal radial recess (of the well type) relative to the male hooking profile and to the main axis (XX').

Advantageously, the hooking profile of the fixing bushing 22 can be substantially mating the hooking profile of the shaft 20, so that the sleeve 23 has a substantially constant radial thickness, at least in the area comprised between the hooking profile 31, 32 of the shaft 20 and the hooking profile 40, 41, 42 of the fixing bushing 22 (here at least in the downstream segment 23B of the sleeve 23).

Thus, the fixing bushing 22 preferably has an inner wall which has, at a radial distance from the shaft 20, a sinuous hooking profile 40, 41, 42 of the bushing which is substantially or even exactly mating the shaft hooking profile 31, 32 formed by the stop grooves which serve to (at least axially) retain the downstream segment 23B of the sleeve 23.

Such an arrangement limits the shearing stresses and improves the longevity of the sleeve and therefore of the damping device 1.

It will be noted that, preferably, during the preparation step (a) (FIG. 3) and, especially, during the over-molding step (b) (FIG. 4), the male alternation(s) 40, 42 of the hooking profile of the fixing bushing 22 will be axially offset relative to the corresponding female alternation(s) (the bottoms of the stop grooves) 31, 32 of the hooking profile of the shaft 20 by a value substantially equal to the offset value d1 by which the fixing bushing 22 is displaced relative to the shaft (or vice versa) during step (c) of creating the preload.

In this way, when the fixing bushing 22 is brought into its second position P2, and the sleeve 23 (and more generally the device 1) is therefore preloaded to the desired value, the male alternation(s) 40, 42 of the hooking profile of the fixing bushing 22 are axially opposite to the corresponding female alternation(s) (the bottoms of the stop grooves) 31, 32 of the hooking profile of the shaft 20, substantially in a same plane normal to the main axis (XX'), so that the respective hooking profiles of the bushing 22 and the shaft 20 are (perfectly) superimposed, as illustrated in particular in FIG. 5.

Here again, this will allow obtaining a better distribution of the stresses in the sleeve 23, both when the fixing bushing 22 is at rest in its second position P2 and when said bushing 22 is biased later, within the steering system 3, in axial displacement on one side or the other of said second position P2.

According to a preferred characteristic which can constitute an invention in its own right, during the locking step (d), an upstream segment 23A of the elastomeric sleeve 23 is radially pushed by a centripetal plastic deformation of the fixing bushing 22, so as to radially penetrate, as illustrated in FIG. 6, said upstream segment of the sleeve 23A, but not the fixing bushing 22 itself, against the locking flange 30.

More particularly, an upstream segment 23A of the elastomeric sleeve 23 is radially pushed by a centripetal plastic deformation of the fixing bushing 22, so as to radially penetrate said upstream segment of the sleeve 23A, but not the fixing bushing 22 itself, into a locking groove 33 which is hollowed in the shaft 20 and which has a wall, here in particular an upstream wall, forming a locking flange 30 intended to prevent said upstream segment 23A of the sleeve from performing a return movement opposite to the movement which corresponds to the load direction S1.

Here, to the extent that the device 1 is preloaded in tension, which causes a compression of the sleeve 23, so that the upstream segment 23A is axially moved towards the downstream segment 23B during the movement performed in the load direction S1, then said locking groove 33 has therefore more preferentially the purpose of preventing the upstream segment 23A of the sleeve from axially and elastically redeploying in the upstream direction, relative to the shaft 20, and therefore the purpose of thus axially blocking the upstream segment 23A of the sleeve relative to said shaft 20.

Advantageously, the locking is thus operated by a plastic constriction of the bushing 22, which drives an annular bead 23A-1 of the sleeve 23 towards and in the locking groove 33, so as to create a radial interference between the upstream segment 23A of the sleeve 23 and the shaft 20.

Fixing the upstream portion 23A of the sleeve 23 on the shaft 20 is thus ensured in a stable and solid manner.

Here again, the locking groove 33, which cooperates with the bead 23A-1 of the sleeve 23, will preferably have a rounded profile, in order to avoid stress concentrations.

However, the locking does not have the effect of creating an interference between the fixing bushing 22 and the shaft 20, and in particular does not clamp the bushing 22 on the shaft 20, so that the device 1 maintains, after locking, the relative axial mobility of said shaft 20 relative to said bushing 22.

Furthermore, the method preferably comprises, and preferentially after preloading and locking the sleeve, an assembly step (e), during which the fixing bushing 22 is fixed, preferably by crimping, into a case 50 belonging to the second mechanical part 2B.

The case 50 may advantageously form a terminal bulge on the upstream end of the downstream portion 2B of the tie rod shaft, in which a receiving housing 51 is bored which receives the sub-assembly formed by the downstream end of the shaft 20, the bushing 22 and the sleeve 23 which cap said downstream end of the shaft 20, as illustrated in FIG. 7.

Before crimping, the bushing 22 can be nested into the case 50 in a fitted manner (for example according to an H7h6 type fit), or forcibly nested according to a tight fit (of the H7k6 type, for example), which will allow in particular an accurate positioning of said bushing 22 relative to said case 50, and an alignment of these elements along the main axis (XX').

Fixing the fixing bushing 22 by crimping into the case 50 can advantageously be performed by plastically folding a flange 52 (preferably an annular flange) of the case 50 over a skirt 53 of the fixing bushing 22, preferably located at the upstream end of said bushing 22.

Such an assembly will indeed be particularly reproducible, simple and fast to achieve.

Figure 8:
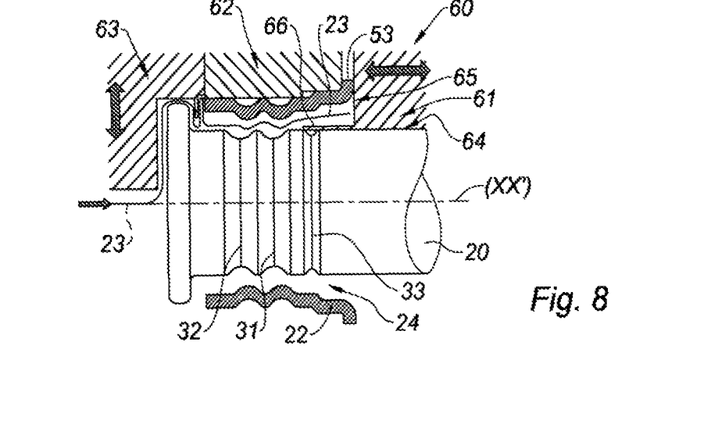
FIG. 8 illustrates, in a longitudinal sectional view, a tooling example allowing to perform the over-molding of the sleeve of the device of FIGS. 3 to 7.

FIG. 8 schematically illustrates a tooling 60 suitable for performing the steps of over-molding (b) and creating a preload (c).

Conveniently, only half of the tooling 60 was represented relative to the main axis (XX'), the other half is capable of being deduced by symmetry.

Said tooling 60 comprises a base 61, a sheath 62, and two shells 63 (with radial opening movement).

The base 61 is provided on the one hand with a bore 64 arranged to receive the shaft 20, and on the other hand with a support surface 65, here preferably a flat surface, and preferentially normal to the main axis (XX'), and which axially blocks, here on the upstream side, the fixing bushing 22 (by the skirt 53)

It will be noted that, advantageously, the support surface 65 forms an axial abutment which, after over-molding, blocks the upstream segment 23A of the sleeve against the offsetting movement of the shaft 20 in the load direction S1, and, more particularly, which simultaneously blocks the bushing 22 and said upstream segment 23A of the sleeve, thus by temporarily securing said bushing 22 and said upstream segment of the sleeve, while the shaft 20 is offset to create the preload.

The sheath 62 is arranged to center the fixing bushing 22 relative to the shaft 20, on the main axis (XX'), and thus reproducibly define the filling space 24 which radially separates the bushing 22 from the shaft 20.

The shells 63 complete the tooling to define the casting path of the elastomer, located around the downstream end of the shaft 20, and intended to form the sleeve (as schematized by a casting line referenced 23 in FIG. 8).

Initially, the shells 63 being open, the fixing bushing 22 is placed into the sheath 62 (by engaging the bushing 22 into said sheath 62 from the upstream direction) and then the base 61 is axially pressed (from the upstream direction) against the sheath 62 in order to block the bushing 22, by supporting the support surface 65 of the base 61 against the skirt 53 of said bushing 22.

The shaft 20 is then engaged (from the downstream direction) through the bushing 22 and into the bore 64 of the base until reaching the first position P1.

The shells 23 are then closed and the elastomeric material which constitutes the sleeve 23 is injected.

It will be noted that the tooling 60, and more preferentially the base 61, advantageously has a deflector 66, here preferably in the shape of a tubular extension 66 of the base 61 which extends the bore 64, a deflector 66 which temporarily masks the locking groove 33 (and therefore more generally the locking flange 30) of the shaft 20 during the over-molding step (b), in order to prevent the elastomeric material (constituting the sleeve 23) from filling said locking groove 33 (and therefore from coming into contact with the locking flange 30), and thus in order to form an empty radial space, between the upstream segment 23A of the sleeve 23 and the locking groove 33 (respectively the locking flange 30), which will allow the shaft 20, and more particularly the locking groove 33 (and therefore the locking flange 30), to be displaced relative to said upstream segment 23A of the sleeve (or vice versa) during step (c) of creating a preload, before the locking step (d).

Once the sleeve 23 is solidified, the shells 63 are opened and the shaft 20 is pulled from the upstream direction (FIG. 5), or, in an equivalent manner, said shaft 20 is pushed from the downstream direction, so as to force the displacement of the shaft 20 in the upstream direction, in the load direction S1, and by a value equal to the desired offset d1, so as to bring the shaft 20 into the second position P2 relative to the bushing 22, and in doing so, so as to create a preload of the sleeve 23 by elastic deformation; in FIG. 5, a preload in tension of the device 1 is carried out here, which results in a compression of said sleeve 23.

A radial crimping tool, which replaces the sheath 62, or which is optionally guided by said sheath 62, is then used to lock the sleeve 23 in its preloaded configuration by a centripetal radial plastic deformation of the bushing 22 and a resulting formation of the bead 23A-1 in the locking groove 33 of the shaft 20.

It will be noted that the offset d1 is preferably selected such that, when creating the preload, and as illustrated in FIG. 5, the shaft 20 is not brought into axial abutment against the fixing bushing 22 in the load direction S1, that is to say that the offset d1 is selected so as to preserve an axial clearance JA which allows the shaft to still be axially movable relative to the bushing 22 in the load direction S1, from the second position P2, against an (additional) elastic deformation of the sleeve 23.

Here, in the case of FIG. 5, a tension displacement reserve (of the shaft 20) will therefore be maintained after preloading the device 1 by a first tension which switched the shaft 20 from the first position P1 to the second position P2.

It will be noted that, as illustrated in FIG. 7, the total axial stroke of the shaft 20 relative to the fixing bushing 22, and more generally relative to the second mechanical part 2B, may be delimited by an upstream abutment formed by the downstream edge 22L of the bushing 22, and by a downstream abutment formed by the bottom of the receiving housing 51, with which a collar 55 of the shaft 20 alternately cooperates (said collar 55 being supported against the downstream abutment 54 at a maximum compression of the device 1, and supported against the upstream abutment 22L at a maximum extension of the device 1).

Of course, the invention also concerns as such a damping device 1 obtained according to either one of the characteristics of the method described above.

Particularly, the invention concerns a damping device 1 comprising a shaft 20 which extends along a main axis (XX') and which is intended to be connected to a first mechanical part 4, a fixing bushing 22 which surrounds said shaft 20 and which is intended to be connected to a second mechanical part 2B, 50, as well as a sleeve 23 made of elastomeric material which is arranged between the shaft 20 and the fixing bushing 22 so as to allow, by its elastic deformation, at least one axial displacement of the fixing bushing relative to the shaft, the device 1 in which the sleeve 23 is maintained (only by the shaft 20, or only by the bushing 22), when the device is at rest, in a state of permanent axial elastic deformation which creates and maintains an axial preload of said sleeve 23, and more generally an axial preload of the shaft 20 relative to the bushing 22, and therefore an axial preload of the device 1.

The invention also concerns a tie rod 2 whose shaft 2A, 2B, 20 is equipped with a damping device 1 according to the invention, as well as a steering system 3, preferably a power steering system, which comprises such a tie rod 2.

The invention finally concerns a vehicle, and more particularly a motor vehicle with wheels, provided with such a steering system 3.

Of course, the invention is in no way limited to the sole variants previously described, the one skilled in the art being in particular able to isolate or combine freely together either of the aforementioned characteristics, or to substitute them with equivalents.

Particularly, it could be considered that the sleeve 23 is maintained in preload by the fixing bushing 22 (exclusively), rather than by the shaft 20 (exclusively), in which case it would be the bushing 22 which would carry on the one hand one or more stop shoulder(s) intended to axially block the downstream portion 23B of the sleeve and on the other hand one or more locking flange(s) intended to axially block the upstream segment 23A of the sleeve, after elastic axial deformation and preloading of the sleeve 23.

The invention claimed is:

1. A method for manufacturing a damping device comprising a shaft, which extends along a main axis and which is intended to be connected to a first mechanical part, a fixing bushing which surrounds said shaft and which is intended to be connected to a second mechanical part, and a sleeve made of elastomeric material which is arranged between the shaft and the fixing bushing so as to allow, by its elastic deformation, at least one axial displacement of the fixing bushing relative to the shaft, said method including:
   a preparation step (a), during which the shaft is inserted into the fixing bushing so that the fixing bushing at least partially surrounds the shaft and axially occupies a first position relative to said shaft, and a filling space is provided radially between the shaft and the fixing bushing,
   an over-molding step (b), during which the filling space is at least partially filled so as to create the elastomeric sleeve which links the shaft to the fixing bushing,
   a step (c) of creating a preload, during which the axial displacement of the fixing bushing relative to the shaft is forced in a direction called «load direction», so as to axially offset the fixing bushing from its first position to a second position axially distinct from the first position, against an elastic deformation of the sleeve, in order to create an axial preload of said sleeve, and therefore an axial preload of the shaft relative to the fixing bushing,
   a locking step (d), during which the elastomeric sleeve is locked against the shaft or against the fixing bushing, so as to maintain on the one hand a relative mobility of the shaft relative to the fixing bushing, via the sleeve, and on the other hand at least partly maintain the axial preload of the sleeve and therefore at least partly maintain the axial preload of the shaft relative to the fixing bushing.

2. The method according to claim 1 wherein the sleeve has, along the main axis on the one hand a downstream segment, which axially abuts, in the load direction, against a stop shoulder arranged on the shaft, and on the other hand an upstream segment, which is forcibly displaced relative to the downstream segment, in the load direction, when offsetting the fixing bushing from its first position to its second position during step (c) of creating the preload, then which is placed, during the locking step (d), against a locking flange provided on the shaft, so that it cannot be displaced in a direction opposite to the load direction.

3. The method according to claim 2 wherein the shaft has a plurality of axially staggered stop grooves in order to provide several annular stop shoulders which cooperate with the downstream segment of the sleeve.

4. The method according to claim 3 wherein the stop grooves of the shaft have rounded shapes so as to axially define, at the surface of the shaft, a corrugated shaft hooking profile.

5. The method according to claim 3 wherein the fixing bushing has an inner wall which has, at a radial distance from the shaft, a sinuous hooking profile which is substantially or even exactly mating the shaft hooking profile formed by the stop grooves which serve to retain the downstream segment of the sleeve.

6. The method according to claim 1 wherein, during the locking step (d), an upstream segment of the elastomeric sleeve is radially pushed by a centripetal plastic deformation of the fixing bushing, so as to radially penetrate said upstream segment of the sleeve into a locking groove which is hollowed in the shaft and which has a wall forming a locking flange intended to prevent said upstream segment of the sleeve from performing a return movement opposite to the movement which corresponds to the load direction.

7. The method according to claim 1 wherein it comprises an assembly step (e), during which the fixing bushing is fixed, into a case belonging to the second mechanical part.

8. The method according to claim 1 wherein the shaft belongs to a tie rod.

9. A damping device comprising
a shaft which extends along a main axis and which is intended to be connected to a first mechanical part,
a fixing bushing which surrounds said shaft and which is intended to be connected to a second mechanical part, and
a sleeve made of elastomeric material which is arranged between the shaft and the fixing bushing so as to allow, by its elastic deformation, at least one axial relative displacement of the fixing bushing relative to the shaft, wherein:

the sleeve is maintained, when the device is at rest, in a state of permanent axial elastic deformation which creates and maintains an axial preload of said sleeve and therefore an axial preload of the shaft relative to the fixing bushing;

the fixing bushing at rest is in a second position that is axially offset from a first position of the fixing bushing after locking of the sleeve; and the fixing bushing can be elastically displaced relative to the shaft on either side of said second position of said fixing bushing by axial sliding via the sleeve which is elastically deformed to accompany said sliding, and the shaft can be elastically displaced relative to the fixing bushing, in axial translation on either side of said second position of said fixing bushing, and in the vicinity of said second position against the elastic return exerted by the preloaded sleeve which can be deformed in order to accommodate such displacement.

10. A power steering system comprising a tie rod whose shaft is equipped with the damping device according to claim 9.

* * * * *